(12) United States Patent
Chen et al.

(10) Patent No.: US 8,430,635 B2
(45) Date of Patent: Apr. 30, 2013

(54) MOUNTING APPARATUS FOR FAN

(75) Inventors: Xiao-Zhu Chen, Shenzhen (CN); Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 470 days.

(21) Appl. No.: 12/869,704

(22) Filed: Aug. 26, 2010

(65) Prior Publication Data

US 2012/0020795 A1 Jan. 26, 2012

(30) Foreign Application Priority Data

Jul. 20, 2010 (CN) .......................... 2010 1 0231589

(51) Int. Cl.
*F04D 29/60* (2006.01)
(52) U.S. Cl.
USPC ................... 416/120; 416/198 R; 416/204 R; 416/244 R

(58) Field of Classification Search ..................... 415/60, 415/66, 213.1, 220; 416/198 R, 244 R, 120, 416/204 R; 361/695
See application file for complete search history.

(56) References Cited

U.S. PATENT DOCUMENTS 6,692,226 B1 * 2/2004 Cheng ........................... 415/119
7,357,708 B2 * 4/2008 Lee ............................... 454/184

* cited by examiner

*Primary Examiner* — Edward Look
*Assistant Examiner* — William Grigos
(74) *Attorney, Agent, or Firm* — Altis Law Group, Inc.

(57) ABSTRACT

A mounting apparatus for mounting a system fan and an exterior fan to a chassis includes a mounting bracket and a plurality of connecting members. The mounting bracket includes a rectangular hollow frame and x-shaped spoke fixed in the rectangular hollow frame. Each of the connecting members includes a first connecting portion and a second connecting portion extending from an end of the first connecting portion. The system fan is secured to the chassis by the first connecting portion each running through the mounting bracket, the chassis, and the system fan. The exterior fan is secured to the chassis by fastening means each running through the exterior fan and one second connecting portion of the connecting members.

4 Claims, 4 Drawing Sheets

MOUNTING APPARATUS FOR FAN

BACKGROUND

1. Technical Field

The present disclosure relates to device mounting and, particularly, to a mounting apparatus for mounting a system fan and an exterior fan to a chassis of an electronic device.

2. Description of Related Art

Electronic devices often generate heat during operation, and may be damaged if the heat is not removed effectively. An electronic device can use a system fan and an exterior fan to produce airflow for cooling the electronic components. Conventionally, the system fan is mounted in the electronic device by a mounting apparatus and the exterior fan is mounted in the electronic device by another mounting apparatus, making it difficult and time consuming to replace or remove the fans for repair.

Therefore, a mounting apparatus is desired to overcome the limitations described.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
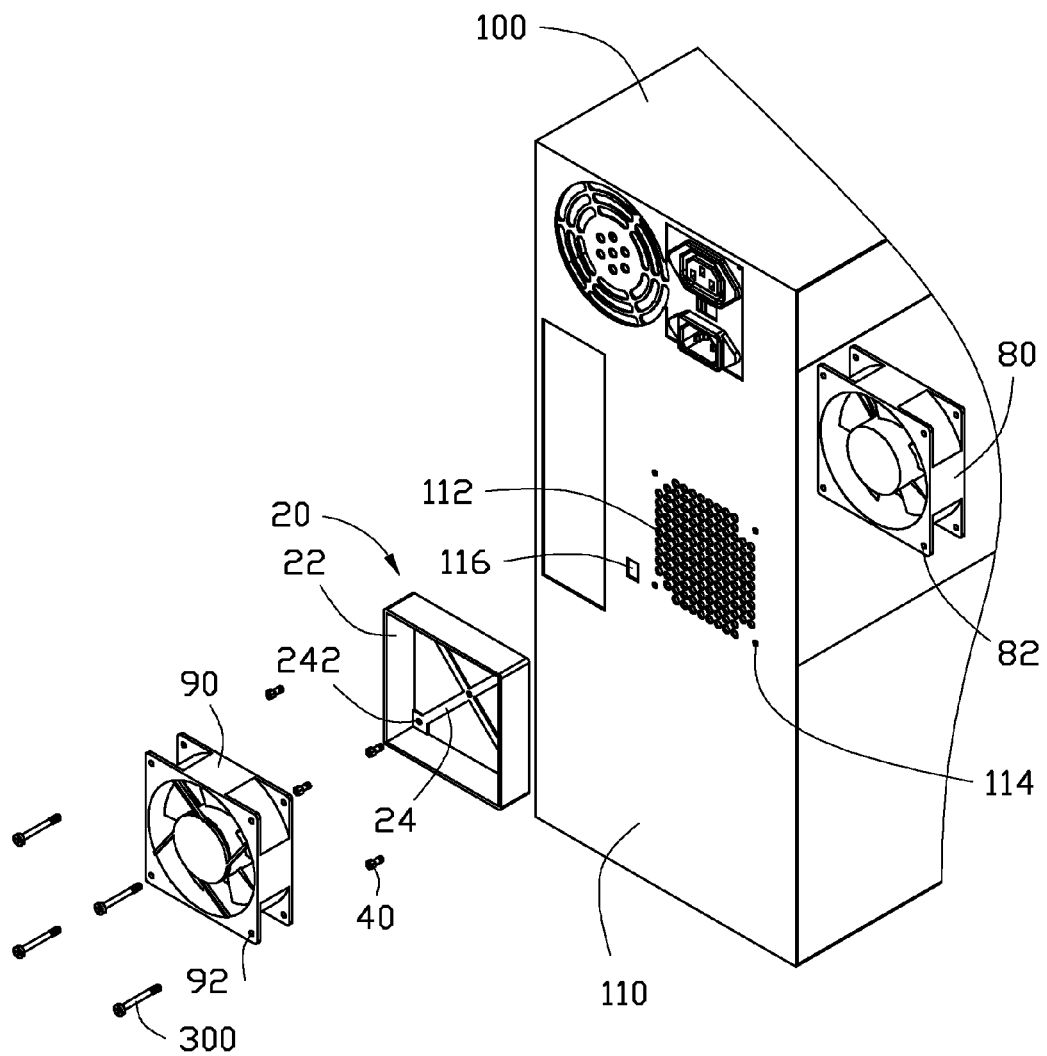
FIG. 1 is an exploded, isometric view of a mounting apparatus according to an exemplary embodiment applicable with a system fan, an exterior fan, and a chassis.

Referring to FIG. 1, a mounting apparatus according to an exemplary embodiment for mounting a system fan 80 and an exterior fan 90 to an inside and an outside of a computer chassis 100 is shown. A grille area 112 is defined on a rear wall 110 of the computer chassis 100. The grille area 112 defines a through hole 116 and four fixing holes 114 in four corners thereof respectively. The system fan 80 defines a plurality of first threaded holes in four corners thereof respectively. In the illustrated embodiment, the plurality of first threaded holes is shown as four first threaded holes 82. The first threaded holes 82 are internally threaded. The exterior fan 90 defines a plurality of second threaded holes in four corners thereof respectively. In the illustrated embodiment, the plurality of first threaded holes is shown as four second threaded holes 92. The second threaded holes 92 are internally threaded. The mounting apparatus includes a mounting bracket 20 and a plurality of connecting members 40.

The mounting bracket 20 includes a rectangular hollow frame 22 and x-shaped spoke 24 fixed in the rectangular hollow frame 22. Four ends of the x-shaped spoke 24 are connected to four corners of the rectangular hollow frame 22. The x-shaped spoke 24 defines four assembly holes 242 in the four ends thereof respectively. The assembly holes 242 extend through the mounting bracket 20.

Figure 2:
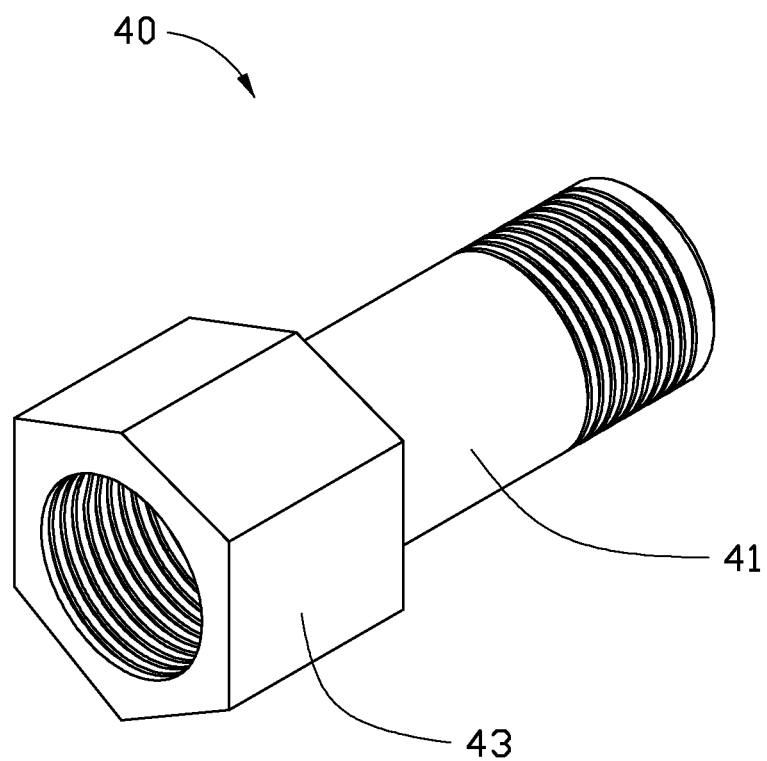
FIG. 2 is an enlarged view of a connecting member of the mounting apparatus of FIG. 1.

Referring to FIG. 2, each of the connecting members 40 includes a first connecting portion 41 and a second connecting portion 43 extending from an end of the first connecting portion 41. In the illustrated embodiment, the first connecting portion 41 is a fastener, and the second connecting portion 43 is a threaded retaining member for engaging with fastening means.

Figure 3:
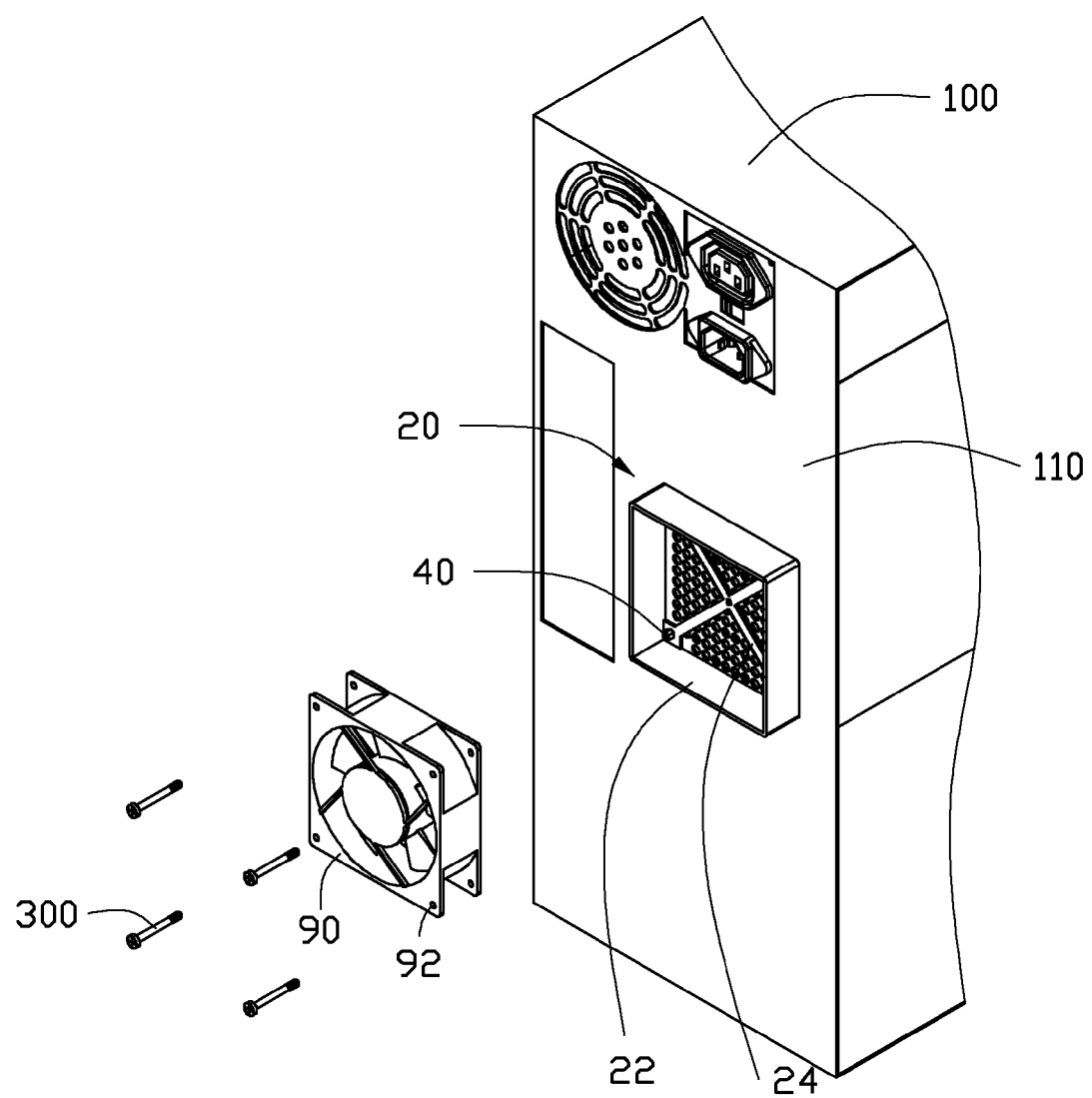
FIG. 3 is a partially assembled, isometric view of FIG. 1, showing the system fan and the chassis secured to each other by the mounting apparatus.
Figure 4:
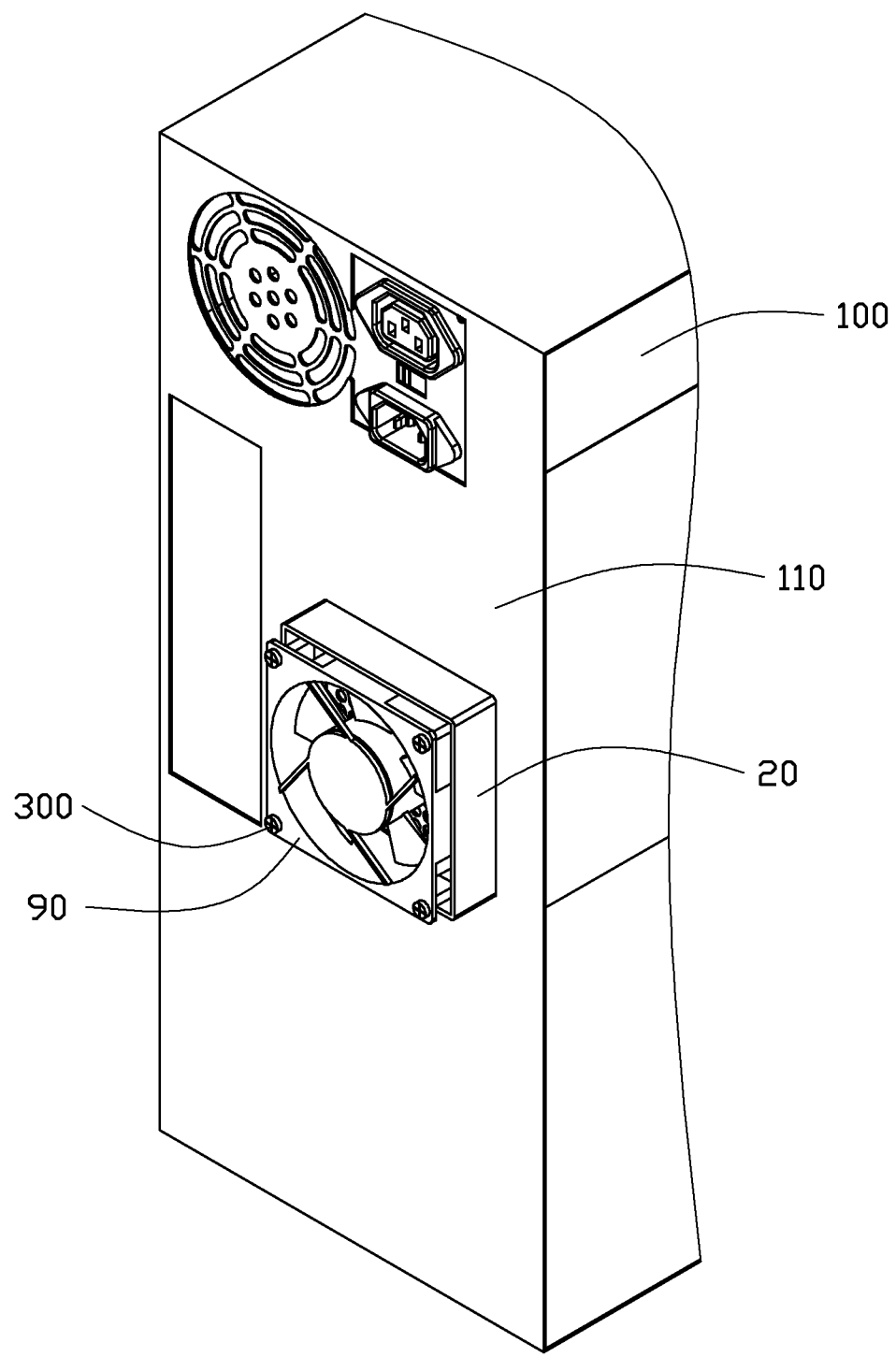
FIG. 4 is an assembled, isometric view of FIG. 1.

Referring to FIGS. 3-4, in assembly of the system fan 80 and the exterior fan 90 to the computer chassis 100, the system fan 80 and the mounting bracket 20 abut the inside and the outside of the computer chassis 100 respectively, and the first threaded holes 82 of the system fan 80 and the assembly holes 242 of the mounting bracket 20 are aligned with the fixing holes 114 of the rear wall 110 of the computer chassis 100. The system fan 80 and the inside of the computer chassis 100 can be secured to each other by the first connecting portion 41 of the connecting members 40 each running through one assembly hole 242 of the mounting bracket 20, one fixing hole 114 of the computer chassis 100, and one first threaded hole 82 of the system fan 80. The exterior fan 90 and the outside of the computer chassis 100 can be secured to each other by the exterior fan 90 received in the rectangular hollow frame 22 of the mounting bracket 20, the second threaded holes 92 of the exterior fan 90 are aligned with the second connecting portion 43 of the connecting members 40, and fastening means 300 each running through one second threaded holes 92 of the exterior fan 90 and one second connecting portion 43 of the connecting members 40.

While the invention has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A mounting apparatus for mounting a system fan and an exterior fan to an inside and an outside of a chassis, the mounting apparatus comprising:
  a mounting bracket comprising a rectangular hollow frame and x-shaped spoke fixed in the rectangular hollow frame, wherein four ends of the x-shaped spoke are connected to four corners of the rectangular hollow frame, and wherein the four ends of the x-shaped spoke define four assembly holes therein extending through the mounting bracket; and
  a plurality of connecting members, wherein each of the connecting members comprises a first connecting portion and a second connecting portion extending from an end of the first connecting portion, wherein the system fan is secured to the chassis by the first connecting portion each running through the mounting bracket, the chassis, and the system fan, wherein the exterior fan is secured to the chassis by fastening means each running through the exterior fan and one second connecting portion of the connecting members.

2. The mounting apparatus of claim 1, wherein the first connecting portion is a fastener; and wherein the second connecting portion is a threaded retaining member.

3. The mounting apparatus of claim 1, wherein the system fan comprises a plurality of first threaded holes in four corners thereof respectively, and wherein the first threaded holes are internally threaded and receive the first connecting portions of the connecting members.

4. The mounting apparatus of claim 1, wherein the exterior fan comprises a plurality of second threaded holes in four corners thereof respectively, and wherein the second threaded holes are internally threaded and engage with the fastening means.

* * * * *